United States Patent [19]
Greene

[11] Patent Number: 5,934,873
[45] Date of Patent: Aug. 10, 1999

[54] HELICOPTER ROTOR TIP JET

[75] Inventor: Leonard M. Greene, White Plains, N.Y.

[73] Assignee: Safe Flight Instrument Corporation, White Plains, N.Y.

[21] Appl. No.: 08/939,715

[22] Filed: Sep. 29, 1997

Related U.S. Application Data

[63] Continuation-in-part of application No. 08/886,017, Jun. 30, 1997, abandoned.

[51] Int. Cl.$^6$ ....................................................... F02C 3/16
[52] U.S. Cl. ................................ 416/22; 416/23; 60/39.35
[58] Field of Search ...................................... 416/20 R, 21, 416/22, 20 A, 23; 60/39.35; 244/17.11

[56] References Cited

U.S. PATENT DOCUMENTS

| | | | |
|---|---|---|---|
| 2,465,856 | 11/1949 | Emigh . | |
| 2,594,788 | 4/1952 | Marain | 416/20 R |
| 2,605,608 | 5/1952 | Barclay . | |
| 2,690,809 | 8/1954 | Kerry . | |
| 2,710,067 | 5/1955 | Sforzn . | |
| 2,894,589 | 8/1959 | Ehrich . | |
| 2,952,154 | 4/1960 | Traksel . | |
| 2,978,205 | 4/1961 | David | 416/20 R |
| 3,699,771 | 10/1972 | Chelminski | 416/20 R |

FOREIGN PATENT DOCUMENTS

| | | | |
|---|---|---|---|
| 715391 | 9/1954 | United Kingdom | 416/20 R |

*Primary Examiner*—Christopher Verdier
*Assistant Examiner*—Richard Woo
*Attorney, Agent, or Firm*—Dougherty & Troxell

[57] ABSTRACT

A helicopter includes a rotor tip jet engine which combines ram compression and centrifugal compression to increase the thrust. A first flow of fuel is dispersed in the ram air and is carried into a combustion area of the engine. A separate flow of fuel is injected into the centrifugally compressed air before the fuel air mixture enters the combustion area. For helicopters and other applications, the ram jet engine combines ram air and a separate mass of compressed air which is directed into the combustion area for increased thrust. A regulator or control mechanism is also provided for regulating the quantity of compressed air which is added. The regulator or control mechanism may also be used to cut off or stop the addition of the separate mass of compressed air.

10 Claims, 5 Drawing Sheets

HELICOPTER ROTOR TIP JET

This is a Continuation-In-Part of U.S. patent application Ser. No. 08/886,017 which was filed on Jun. 30, 1997 and is now abandoned.

FIELD OF THE INVENTION

This invention relates to a helicopter rotor tip jet and more particularly to a hybrid engine wherein the combination of ram compression and compressed air such as that provided by centrifugal compression is used in a helicopter rotor tip jet or for other applications.

Background for the Invention Rotary winged aircraft or helicopters as they are more commonly known comprise a fuselage and a generally vertical mast or shaft having a lower end which is held within the fuselage. They also include a plurality of wings or blades commonly referred to as rotors which rotate about the shaft or mast. These rotating wings cause the aircraft to travel vertically, forward, backward and sideways. Such aircraft also include propulsion means such as a jet engine for rotating the rotors.

Helicopters have also been powered by the thrust of ram jets which are located at the tips of the rotors or blades. For example, a Hiller model HJ-1 Hornet, a small two place ram jet power helicopter, became the first ram jet power unit to be certified in the United States and also the first C.A.A. approved tip mounted power plant for helicopters.

However, the use for tip mounted ram jets has not proven to be very useful because the ram jets are inefficient at the speeds that can be achieved at the tip of the rotor or blade. Both from a strength standpoint and from a shockwave standpoint, the speed is limited. The problem is that the ram compression is less than the impact pressure because the airflow is not stopped (as it would be on impact), but instead can only be slowed down to the velocity needed to support the flame and exhaust velocity that gives thrust to the jet.

It is now believed that there may be a commercial market for a helicopter having a tip mounted ram jet which overcomes the aforementioned problems. It is also believed that the aforementioned problems can be overcome by providing additional pressurized air to the flame area of a ram jet engine in accordance with the present invention.

BRIEF SUMMARY OF THE INVENTION

In essence, the present invention contemplates a helicopter which includes a fuselage and a generally vertical mast or shaft with a lower end held within the fuselage. The helicopter also includes a rotor or rotary wing and a ram jet engine mounted at the outer tip of the rotor for propelling the rotor around the mast. The rotor or rotary wing includes air inlet means at a distance from its tip and means for directing a flow of air which is subjected to centrifugal force through the rotor and into the ram jet engine to thereby increase the thrust of the ram jet engine.

The invention also contemplates a ram jet engine for use in a helicopter. The ram jet engine includes an elongated shell or housing and air intake means in a forward portion of the housing for receiving a flow of ram air. The engine also includes a combustion chamber which is disposed in the housing downstream from the air intake means and an exhaust nozzle. In addition, the engine includes ignition means disposed within the housing between the air intake means and the combustion chamber and a fuel nozzle which is disposed within the housing between the air intake means and the ignition means. Means such as a fuel line supply a flow of fuel to the fuel nozzle for dispersion thereby into a flow of ram air for ignition by the ignition means. A key element of the present invention resides in means for injecting compressed air, as for example that provided by subjecting a mass of air which is separate from the ram air to centrifugal force, into the combustion chamber. In the preferred embodiment of the invention, the pressurized air passes through a side of the housing, rearwardly of the air intake means and into the flame area of the combustion chamber.

The invention will now be described in connection with the accompanying drawings wherein like reference numbers have been used to designate like parts.

DETAILED DESCRIPTION OF THE PREFERRED EMBODIMENTS OF THE INVENTION

Figure 1:
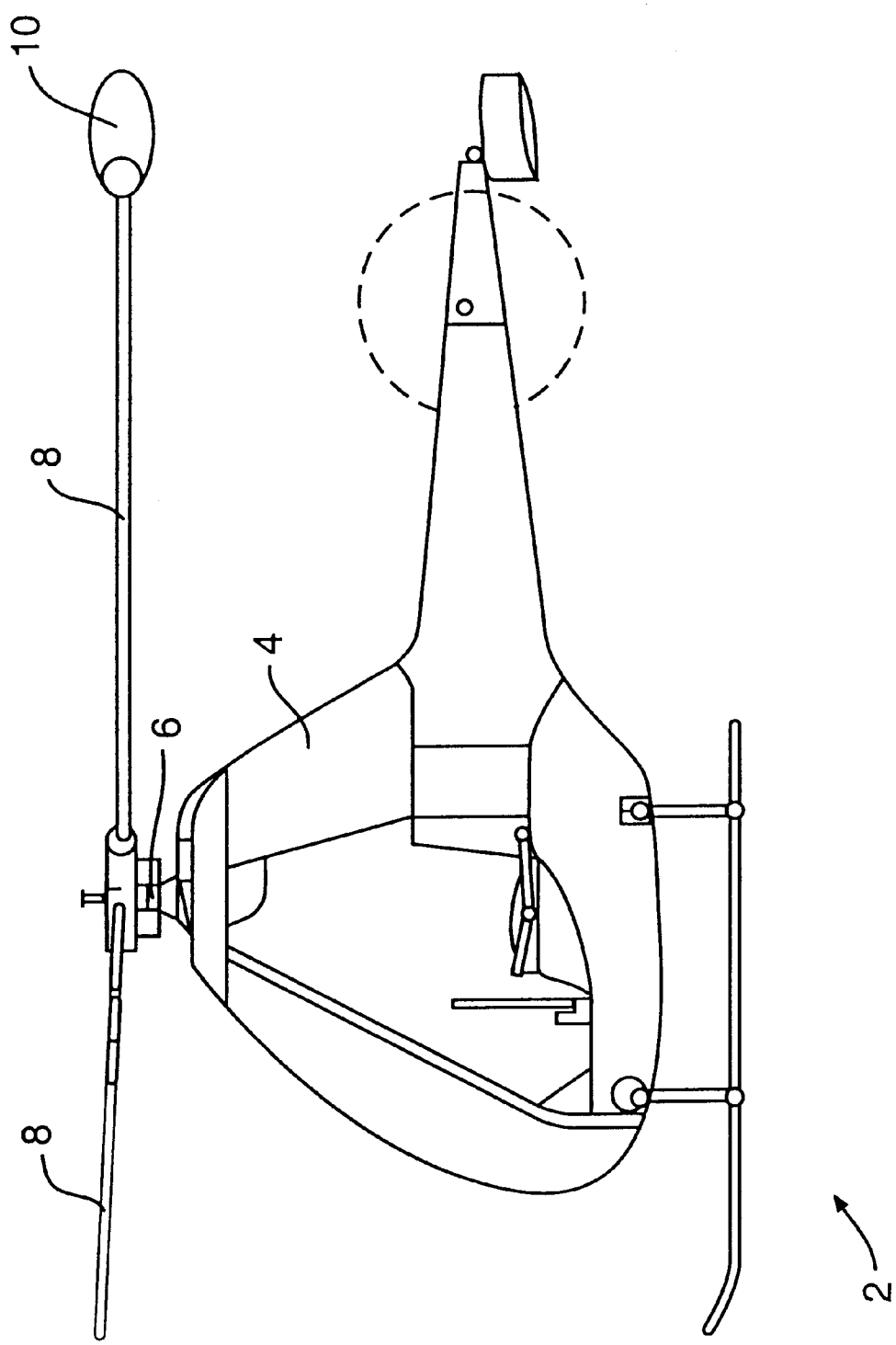
FIG. 1 is a side elevational view of a helicopter in accordance with the present invention.
Figure 2:
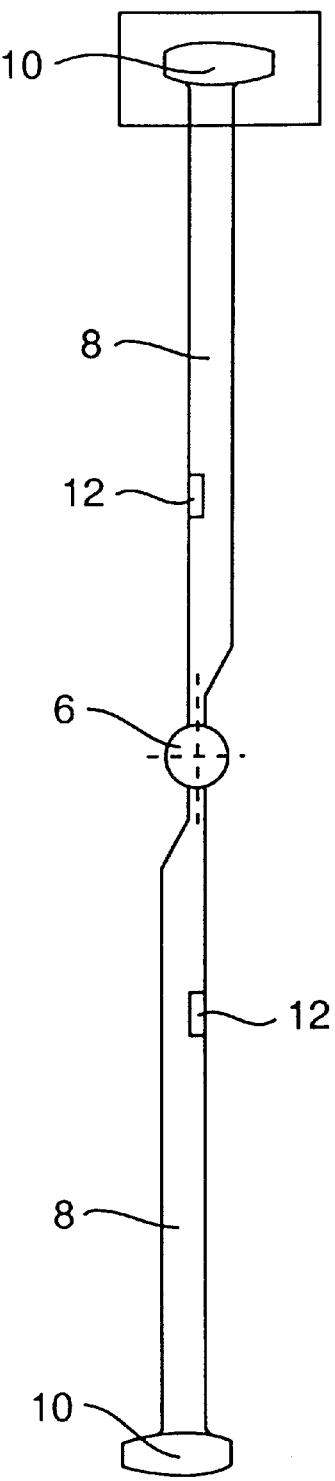
FIG. 2 is a top or plan view of a helicopter rotor having a ram jet engine mounted on the outer tip of the rotor.

As illustrated in FIGS. 1 and 2, a rotary wing aircraft or helicopter 2 includes a fuselage 4 which may be of any conventional design. The helicopter 2 as in other conventional designs also includes a shaft or mast 6 which is essentially perpendicular to and extends upwardly through the roof or top of the fuselage 4. The mast 6 may also be referred to as generally vertical assuming that the fuselage 4 forms the basis for a horizontal plane.

The helicopter 2 also includes one or more rotary wings or rotors 8 which rotates about the mast 6 to provide lift for the aircraft. The rotation of the rotors 8 cause the aircraft to travel vertically, forward, backward and sideways in a manner which will be well understood by persons of ordinary skill in the helicopter field. The helicopter 2 in accordance with the present invention also includes a ram jet engine 10 at the outer tip of each of the rotors 8 for rotating the rotors 8 about the mast 6.

Figure 3:
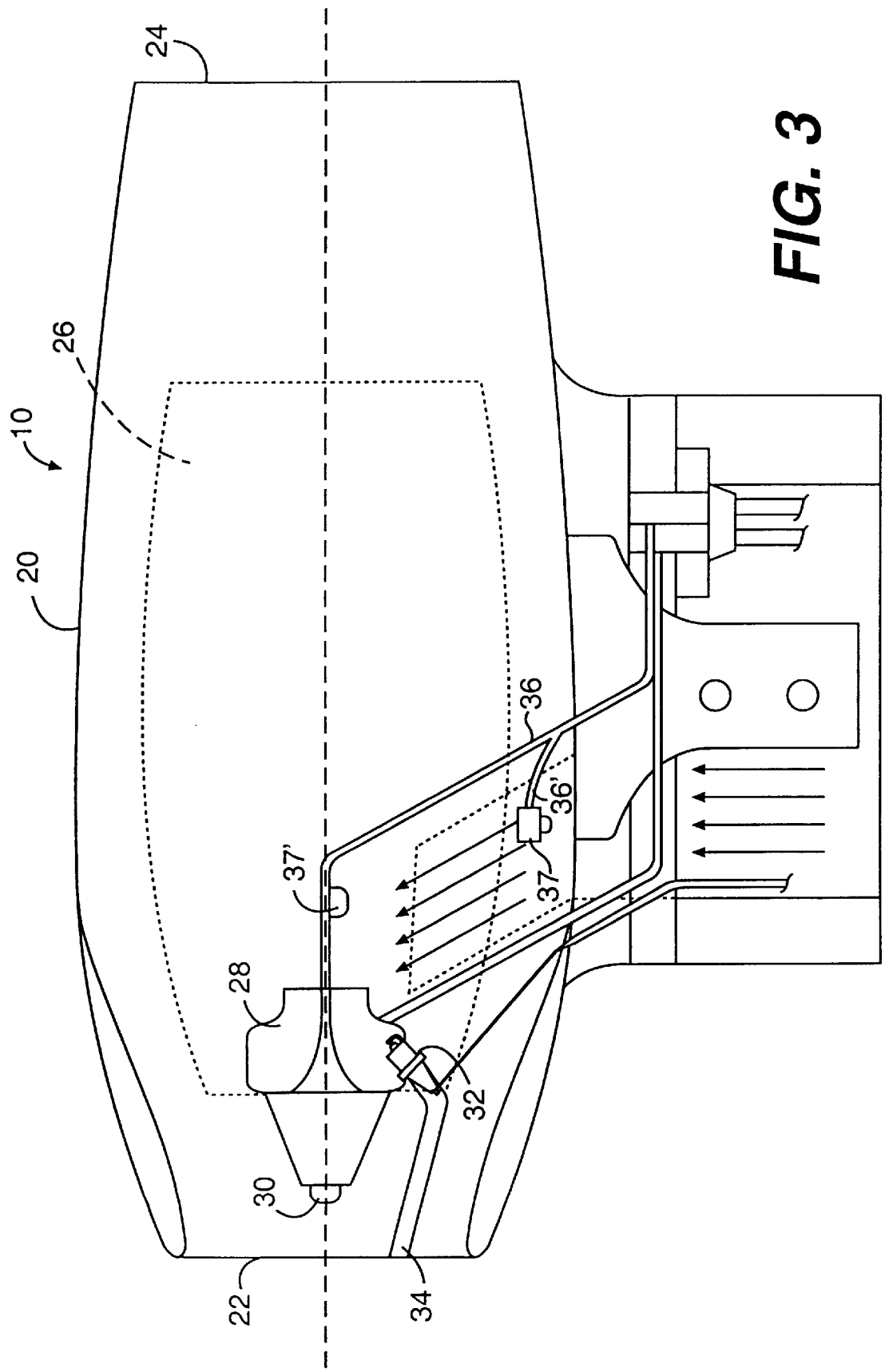
FIG. 3 is a top or plan view illustrating the centrifugal air flow and fuel lines for supplying fuel and added air to a ram jet engine in accordance with a preferred embodiment of the invention.

As shown more clearly in FIG. 2, the rotor 8 also includes one of more air inlets or air intakes 12 in a forward inner portion of each of the rotors 8. As illustrated, the rotors 8 rotate in a counterclockwise direction and the air intakes 12 are located in the forward surface of the rotors and preferably near the inner ends thereof. Air which enters through the intakes 12 is forced outwardly through the interior of rotor 8 by centrifugal force and is fed into the ram jet engine 10 as will be described in more detail in connection with FIGS. 3 and 4.

The ram jet engine 10 like conventional ram jet engines includes an engine shell 20 having a ram jet air intake 22 in a forward portion of the ram jet engine 12 and an exhaust nozzle 24 at the rear thereof. The engine 10 like other conventional ram jet engines also includes a combustion area 26 shown by dotted lines in FIG. 3. The engine 12 also includes a conventional ignitor cup 28 and fuel spray nozzle 30 which are in a forward portion of the engine 12. In addition, the engine 12 includes an ignitor 32, a pilot light snorkel tube 34 and means such as a fuel line 36 for delivering fuel to the fuel spray nozzle 30 and a snorkel ignitor fuel line 38. All of the above are of a conventional design with the ignitor 32, pilot light snorkel tube 34 and spray nozzle 30 all disposed in a forward portion of the engine 12. The operation of and interrelation of the aforementioned elements will be well understood by a person of ordinary skill in the field of ram jet engines.

Figure 4:
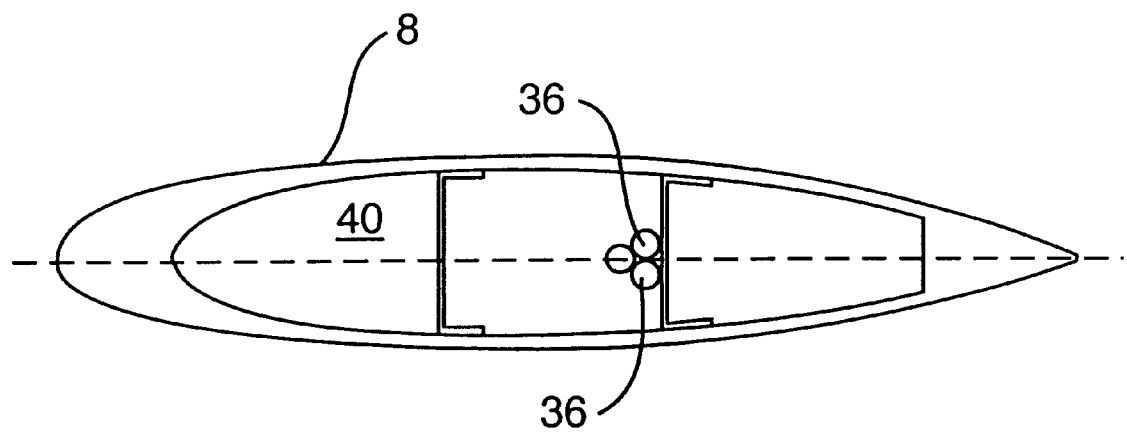
FIG. 4 is a cross sectional view of a rotor and ducting for directing centrifugally pressurized air and fuel to the ram jet engine shown in FIG. 3.

As shown more clearly in FIG. 4, the blade or rotor 8 is hollow and includes a duct 40 which receives air through inlet 12. This duct 40 is separate from fuel lines 36. Accordingly, the centrifugal force of the air which is free of fuel within duct 40 builds up as the blade rotates to a pressure which is equal to the impact pressure at the tip at the rotor 8. Accordingly, it is possible to obtain the necessary pressures within the engine without the normal energy losses associated with a ram jet engine. This is so, because centrifugal air is more efficient than ramming it.

In another embodiment of the invention, a fuel line 36' delivers a flow of fuel to fuel injecting means such as a second or separate spray nozzle 37. The spray nozzle 37, then injects and/or disperses the flow of fuel into the mass of air which has been subjected to centrifugal force. This air fuel mixture is then directed into the combustion area for combustion and adds to the thrust of the engine. A separate spray nozzle 37' may be used in place of the fuel line 36' and spray nozzle 37 for injecting fuel into the centrifugally compressed air.

Figure 5:
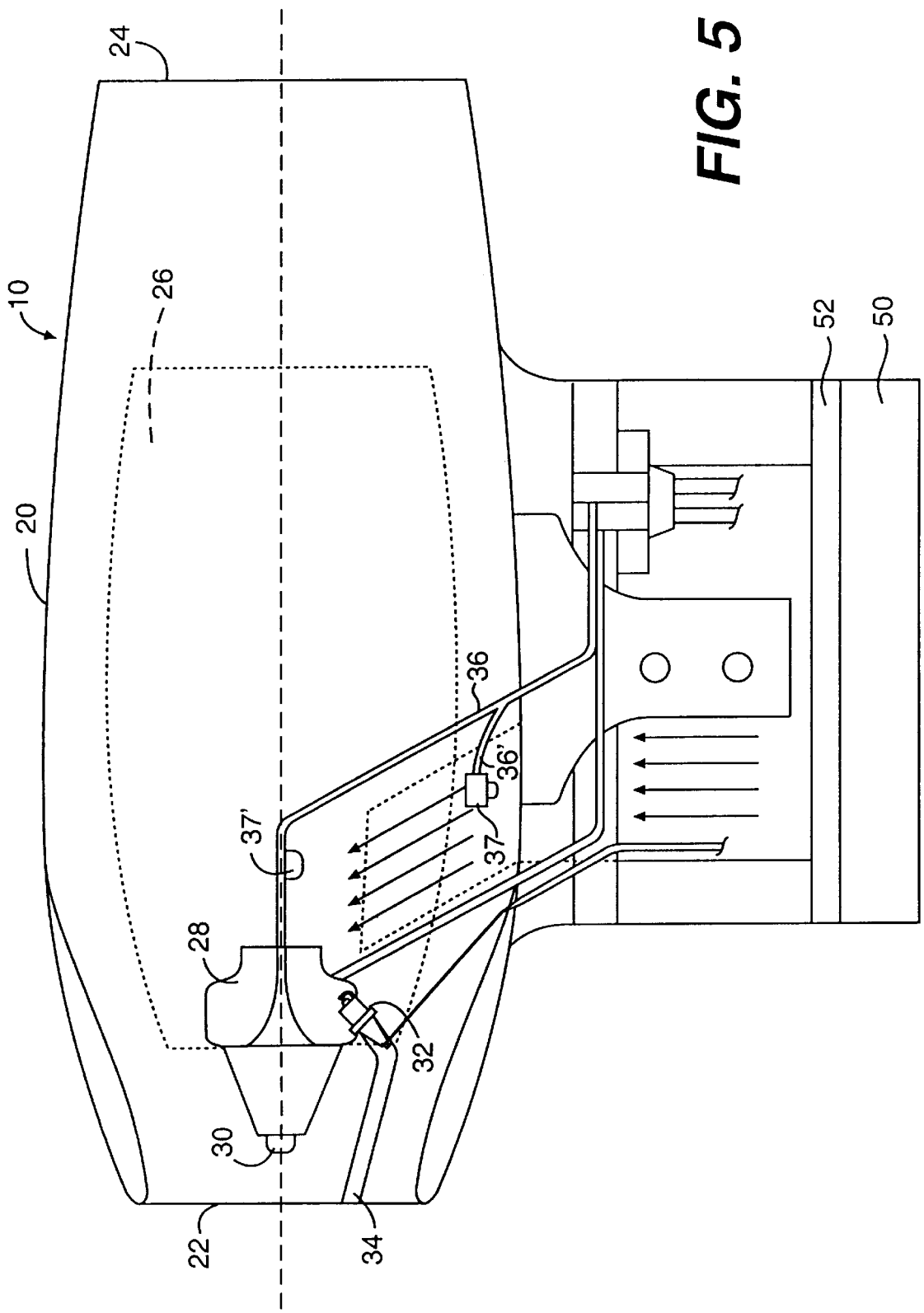
FIG. 5 is a top or plan view which illustrates the flow of compressed air to a ram jet engine in accordance with a second embodiment of the invention.

In a further embodiment of the invention, as shown schematically in FIG. 5, a separate source 50 of compressed air, directs an additional amount of compressed air into the combustion area 26. This addition of compressed air, as in the previous embodiment is injected into the combustion area rearwardly of the ram air to provide for the combined burning of a mixture of ram and compressed air. In essence, the engine utilizes a single merged fire ball.

In this further embodiment, the source 50 of compressed air may be a conventional jet engine, turbine or other form of air compressor. For example, a high pressure bleed off as typically used to power deicers in conventional jet aircraft may be used. The compressed air from the source 50 is then directed through a regulator or control 52 (shown schematically) and from the control 52 into the combustion area 26.

The control 52 may, for example, be used to add a large volume of compressed air and additional fuel into the ram jet at very high speeds or to eliminate the additional compressed air at lower speeds, as for example, during landings and take offs. This control 52 may be a conventional valve or diverter as will be well understood by those skilled in the art.

While the invention has been described in connection with its preferred embodiments, it should be recognized that changes and modifications may be made therein without departing from the scope of the claims.

What is claimed is:

1. A helicopter comprising a fuselage, a mast and a rotor or rotary wing which rotates about said mast above said fuselage for providing lift and direction to the helicopter, said rotor or rotary wing having an inner end adjacent to said mast and an outer tip at the opposite end thereof, and a ram jet engine mounted on said outer tip of said rotor or rotary wing, the ram jet engine having a first, ram jet air intake located at a front of the ram jet engine, a combustion area located to the rear of the ram jet air intake and into which air from the ram jet air intake passes, a fuel spray nozzle for spraying fuel into the air entering the combustion area and an ignitor for igniting the fuel/air mixture in the combustion area said rotor or rotary wing including a second air inlet means located at a position spaced from said tip, and means for directing a flow of air from said second air inlet means and subjecting said flow of air to centrifugal force through said rotor or rotary wing, to centrifugally pressurize the flow of air and inject the centrifugally pressurized air into said ram jet engine to the rear of the fuel spray nozzle and the ignitor to thereby increase the thrust of said ram jet engine.

2. A helicopter according to claim 1 in which the centrifugal force of the air in the rotary wing builds up to a pressure which is equal to the impact pressure at the tip of the rotary wing.

3. A helicopter according to claim 1 which includes duct means in communication with said second air inlet means for increasing the centrifugal force of the air and wherein the air passing through said duct means is free of fuel.

4. A helicopter according to claim 1 which includes fuel injecting means for injecting a flow of fuel into the centrifugally pressurized air.

5. A helicopter according to claim 4, wherein said injecting means injects fuel into the centrifugally pressurized air within the combustion area.

6. A ram jet engine for a rotary wing aircraft comprising. an elongated housing and first air intake means in a forward portion of said housing for receiving ram air, a combustion area in communication with said first air intake means and disposed within said housing rearwardly of said first air intake means and an exhaust nozzle rearwardly of said combustion area, said engine including ignition means disposed within said housing and between said first air intake means and said combustion chamber, a fuel nozzle disposed between said first air intake means and said ignition means and means for supplying a flow of fuel through said nozzle for dispersion thereby into a flow of ram air for ignition by said ignition means, means for subjecting a separate mass of air to centrifugal force; and second air inlet means for directing the separate mass of air after being subjected to centrifugal force into said combustion chamber to the rear of the ignition means and the fuel nozzle to thereby increase the thrust of said engine.

7. A ram jet engine for a rotary wing aircraft according to claim 6, which includes fuel injecting means for injecting fuel into the separate mass of air after the separate mass of air is subjected to centrifugal force.

8. A ram jet engine comprising an elongated housing and first air intake means in a forward portion of said housing for receiving ram air, a combustion area in communication with said first air intake means and disposed within said housing rearwardly of said first air intake means and an exhaust nozzle rearwardly of said combustion area, said engine including ignition means disposed within said housing and between said first air intake means and said combustion area, a fuel nozzle disposed between said first air intake means and said ignition means for supplying a flow of fuel through said nozzle for dispersion into a flow of ram air for ignition by said ignition means; means for compressing a separate mass of air independently of said first air intake means; and second air inlet means for directing the separate mass of compressed air into said combustion area to the rear of the ignition means and the fuel nozzle to thereby increase the thrust of said engine.

9. A ram jet engine according to claim 10 further comprising means for regulating the amount of compressed air which is directed into said combustion area.

10. A ram jet engine according to claim 9 further comprising fuel injecting means for injecting fuel into the separate mass of compressed air before said separate mass of compressed air reaches said combustion area.

* * * * *